July 30, 1963  T. H. BURNETT  3,099,356
FOLDING SERVING CART
Filed Dec. 27, 1960  3 Sheets-Sheet 1
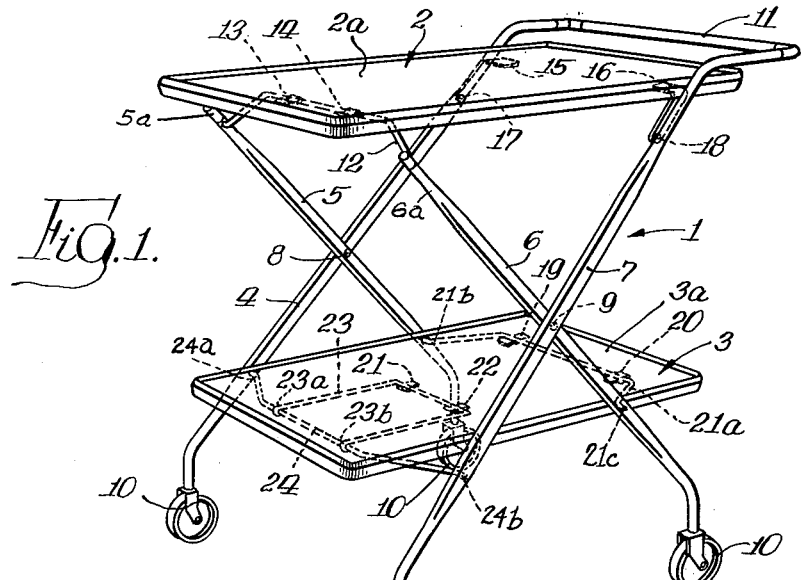
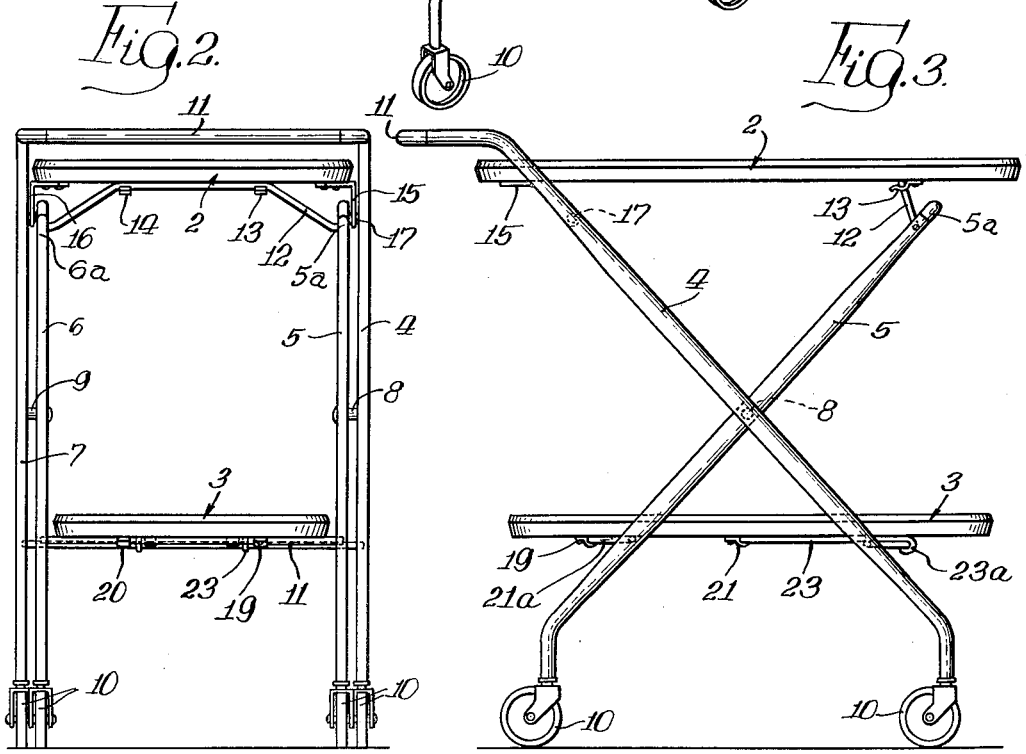
INVENTOR.
Thomas H. Burnett
BY William P. Porcelli
Atty.

July 30, 1963 T. H. BURNETT 3,099,356
FOLDING SERVING CART
Filed Dec. 27, 1960 3 Sheets-Sheet 2
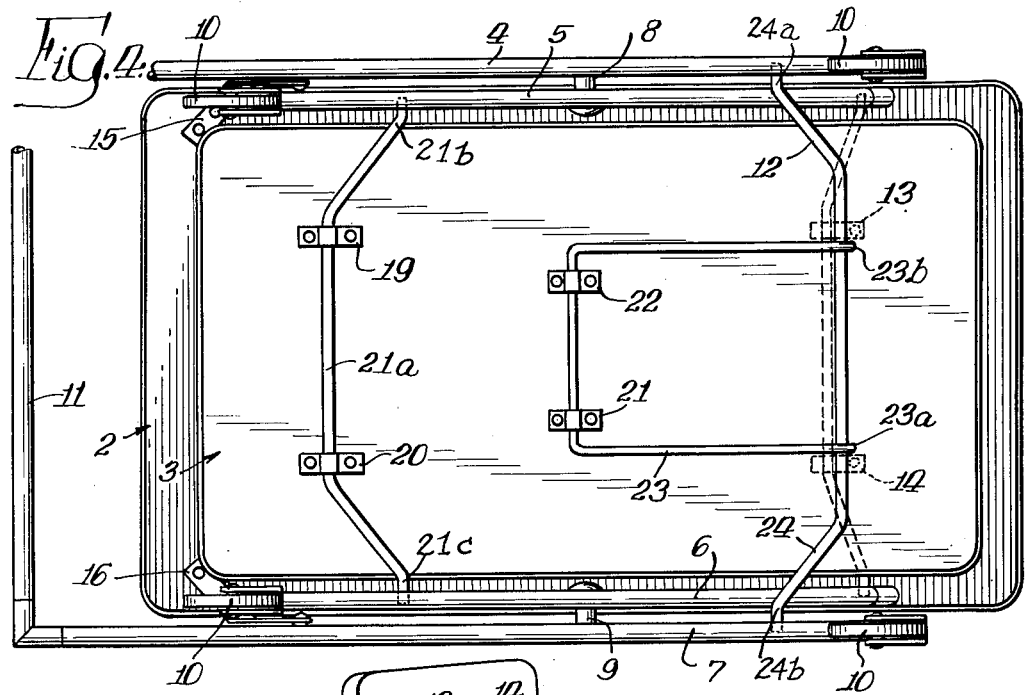
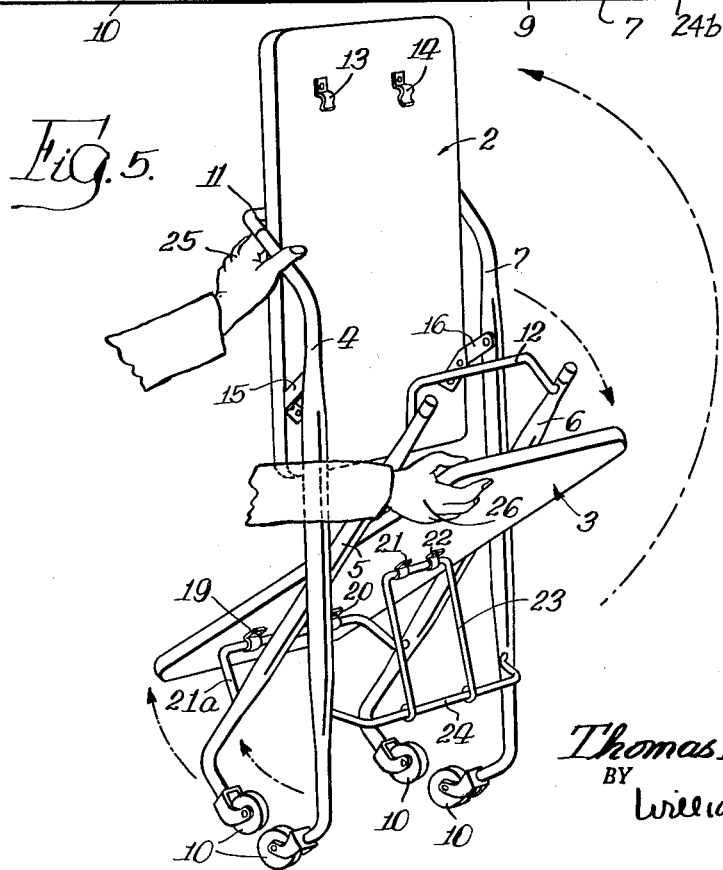
INVENTOR.
Thomas H. Burnett
BY
William P. Porcelli
Atty.

July 30, 1963
T. H. BURNETT
3,099,356
FOLDING SERVING CART
Filed Dec. 27, 1960
3 Sheets-Sheet 3
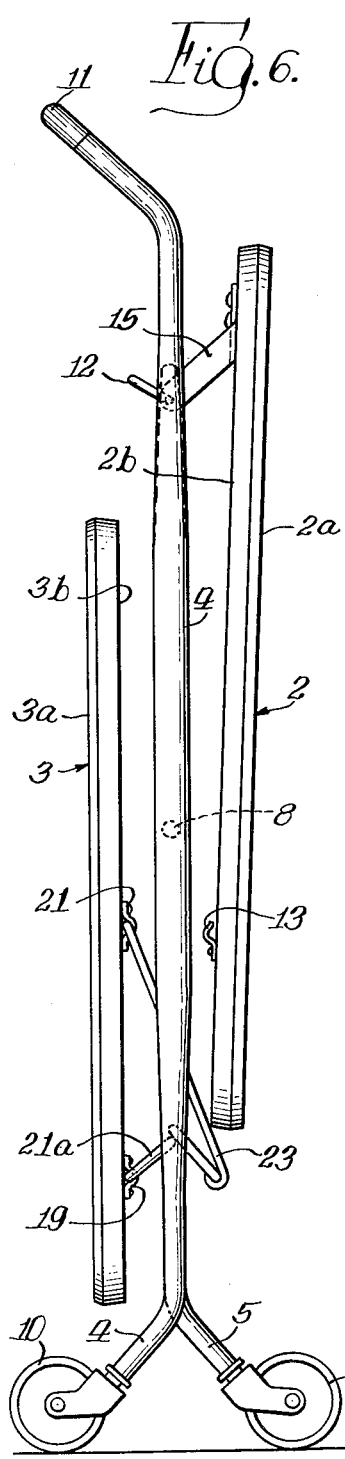
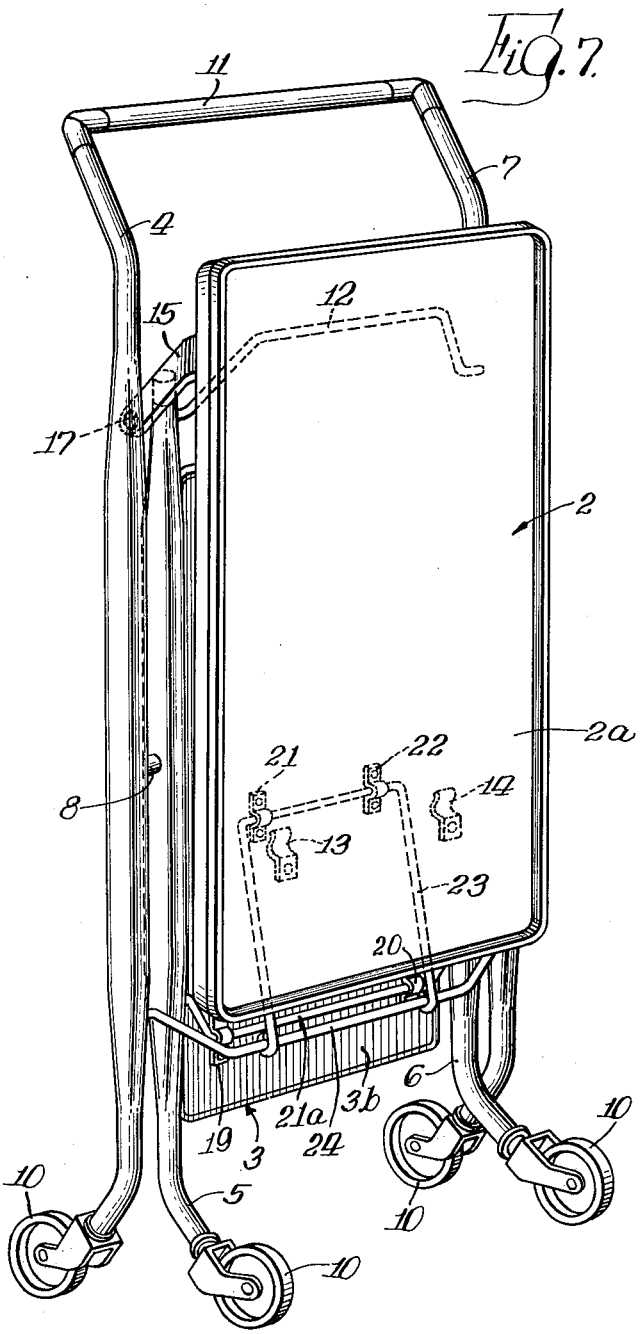
INVENTOR.
Thomas H. Burnett
BY
William P. Porcelli
Atty.

3,099,356
Patented July 30, 1963

3,099,356
FOLDING SERVING CART
Thomas Hunter Burnett, Elgin, Ill., assignor to Acme Steel Company, Chicago, Ill., a corporation of Illinois
Filed Dec. 27, 1960, Ser. No. 78,429
4 Claims. (Cl. 211—132)

This invention relates to the art of serving carts and particularly to an improved folding type.

With the advent of modern living, like other things, living space has become more and more expensive with the result that there are many people who live in less space than they would otherwise. When living in more or less confined or limited space, there has been a trend toward the use of household furnishings and articles which are collapsible or foldable so that they can be stored in a relatively small space compared to that required for them in their unfolded condition. Among the optimum features desired of such an article are that (a) it can be folded into a small volume compact unit, (b) its folding mechanism is simple in construction and to operate and (c) it is at least as decorative and pleasant to view in its folded as in its unfolded condition. It is, therefore, the principal object of this invention to provide an improved serving cart of a foldable or collapsible type having the optimum features mentioned.

Other objects and advantages of the invention should be apparent upon reference to the accompanying drawings, in which FIG. 1 shows a perspective view of a serving cart embodying the invention as it appears in its unfolded condition;

FIG. 2 shows a rear end elevation of the serving cart of FIG. 1;

FIG. 3 shows a side elevation of the serving cart;

FIG. 4 shows an enlarged bottom view of the serving cart;

FIG. 5 shows a perspective view of the serving cart in a partially unfolded condition for the purpose of illustrating the manner of unfolding it;

FIG. 6 shows an enlarged side elevation of the serving cart in its folded or collapsed form; and FIG. 7 shows an enlarged perspective view of the serving cart in its collapsed or folded condition.

In FIGS. 1 to 4, the serving cart 1 in its unfolded and usable form consists of an upper tray 2 and a lower tray 3 positioned parallel to and below it. These two trays 2 and 3 are mounted to be supported by four legs 4, 5, 6 and 7. The legs 4 and 5 are pivoted together centrally on a pin 8 while the legs 6 and 7 are pivoted together centrally on a pin 9. The lower ends of each of these legs 4 to 7 are provided with pivotal type casters 10 so that the cart is ordinarily supported by them and is thereby free to be easily rolled from place to place as required. The upper ends of the legs 4 and 7 are connected together by a U-shaped handle 11 which is intended for manual gripping when the cart is rolled. The upper ends 5a and 6a of the legs 5 and 6 are provided with a brace 12 connected between them. This brace 12 supports the front end of the upper tray 2. Two clips 13 and 14 are connected to the lower surface of the upper tray 2 and snap over the brace 12 to maintain it positioned in contact with the upper tray 2. The rear end of the upper tray 2 is secured to the upper ends of two L-shaped hinge members 15 and 16 whose lower ends are pivoted on pins 17 and 18 to the upper end regions of the legs 4 and 7.

The lower tray 3 is pivoted at its rear end on two brackets 19 and 20 to a brace 21a which is secured in a fixed position at its ends 21b and 21c to the legs 5 and 6. The forward end of the lower tray 3 is pivoted on two brackets 21 and 22 to a U-shaped hinge 23 which is pivoted at its ends 23a and 23b to a bracket 24 which is secured at its ends 24a and 24b in a fixed position to the legs 4 and 7. With this arrangement, the tray 3 in its unfolded or usable position rests upon the brace 21a and bracket 24 to support its weight.

When the parts of the serving cart are in their positions as shown in FIGS. 1 to 4, the serving cart is in its unfolded or usable position where it can function as such a cart for the purpose of supporting objects on the upper surfaces 2a and 3a of the upper and lower trays 2 and 3. When it is desired to fold or collapse the serving cart for storage purposes, the serving cart can be transformed to a folded structure as shown in FIGS. 6 and 7. In FIGS. 6 and 7, the outer surfaces 2a and 3a of the trays 2 and 3 are exposed to view while the lower surfaces 2b and 3b are positioned back to back. Also, all of the legs 4 to 7 are pivoted on the pins 8 and 9 sufficiently that they are in approximate longitudinal alignment with each other to give an appearance as shown in FIGS. 6 and 7 which is neat and compact.

In FIG. 5 there is a general indication of the manner in which the cart is transformed from its condition of FIGS. 6 and 7 to that of FIGS. 1 to 4. Starting with the condition of FIGS. 6 and 7, the upper tray 2 is pivoted on the hinges 15 and 16 to a vertical position with the forward end of the tray 2 extending upwardly against the U-shaped handle 11. The operator temporarily retains the upper tray 2 in this position with one hand while he grasps the forward end of the lower tray 3 with his other hand 26. After grasping the tray 3, he pulls it forward between the two legs 4 and 7 and below the bracket 12. As this motion continues, the legs 4 to 7 pivot on the pivot pins 8 and 9 so that there is a scissors action between the legs 4 and 5 and 6 and 7 as the legs move from alignment with each other into a position of crossing each other. During this time, also, the lower tray 3 pivots on the brace 21a at brackets 19 and 20 and on the hinge 23 at brackets 21 and 22. The hinge 23 pivots on the brace 24. The motion is completed when the hinge 23 becomes approximately flush with the lower surface of the lower tray 3 because the braces 21a and 24 also come into contact with the lower surface of the lower tray 3 which prevents further movement of the parts. After the tray 3 is thus positioned, the upper tray 2 is dropped down into place onto the brace 12. However, in order to allow the brace 12 to be inserted into the open ends of the brackets 13 and 14, the front end of the lower tray 3 is raised upward slightly to move the brace 12 rearwardly while the upper tray is positioned down against the brace 12. Upon release of the lower tray 3 and its downward movement by gravity, the brace 12 slips into the brackets 13 and 14 automatically. At this time, the serving cart will be in its completely unfolded position as shown in FIGS. 1 to 4.

When it is again desired to store the serving cart in a compact unit as shown in FIGS. 6 and 7, the reverse procedure as described for FIG. 5 is followed. The front end of the lower tray 3 is raised slightly to cause release of the brackets 13 and 14 from the brace 12 effected by scissors action of the legs 4, 5 and 6, 7. The upper tray 2 is pivoted to a vertical position as shown in FIG. 5 and the front end of the lower tray 3 is raised up to a vertical position. Since it is intended that the legs 4 through 7 be in alignment with each other, the braces 21a and 24 are deliberately positioned so that they interfere with each other in the folded positions of the legs when they are in alignment with each other. This arrests further movement of the legs 4 through 7. The hinge member 23 is deliberately made of a particular length depending upon the positioning of the brackets 21 and 22 to maintain the lower tray 3 in a vertical position at the end of this folding arrangement, as shown in FIG. 6. Finally, the upper tray is pivoted downwardly to its final position as shown in FIGS. 6 and 7.

It should be apparent what has been shown and described is a serving cart which has two horizontal trays 2 and 3 at different levels which can be used for support of various objects when the cart is being used in its unfolded position as viewed in FIGS. 1 to 4. When it is necessary to store the cart, relatively simple mechanism has been provided which can be manipulated quickly and easily without any loose parts to convert it to a stored condition as shown in FIGS. 6 and 7. When in that condition, it should also be apparent that the upper surfaces 2a and 3a of the trays 2 and 3 are the surfaces which are exposed to view and, ordinarily, these are the finished surfaces of the trays which have the pleasant appearance. Also, since the legs 4 to 7 are in approximate alignment with each other in the stored position, the general over-all appearance of the serving cart is rather attractive even in this condition. Therefore, it can be usually left in plain view when stored because it still remains pleasant in appearance.

Although only a single embodiment of the invention has been shown and described, it should be clearly understood that the invention can be made in many different ways without departing from the true scope of the invention as defined by the appended claims.

I claim:

1. A collapsible table comprising, a tray and supporting means for the tray, said supporting means having two pairs of legs pivotally connected in scissors fashion so as to be angularly movable relative to each other between first and second positions, said tray being hinged at one end to a first brace rigidly secured between one pair of said two pairs of legs below said pivot with said first brace extending outwardly from the plane of the one pair of legs, said tray being hinged toward its other end to the inner end of a link which is hinged at its outer end to a second brace rigidly secured between the other pair of the legs below said pivot with said second brace extending outwardly offset from the plane of the pair of legs, the tray in said first positions of the legs extending horizontally and supported by the legs in the regions where its one end is hinged to the first brace and where the outer end of the link is hinged to the second brace, said link and tray acting as a toggle to cause the legs to move angularly in closing scissor fashion to their second positions upon upward pivotal movement of the tray in the region where its said one end is hinged to said first brace, the length of said link and the positioning of the said hinged connections between the tray, the braces, the two pairs of legs and the link being such that when the tray is moved pivotally upward to a vertical position the two pairs of legs are in parallel alignment with each other.

2. A collapsible table comprising, an upper tray and a lower tray and supporting means for the trays, said supporting means having two pairs of legs hinged together at a point in scissors fashion so as to be angularly movable relative to each other between first and second positions, said lower tray being hinged at one end to a first brace rigidly secured between the first of said two pairs of legs below said pivot with said first brace extending outwardly offset from the plane of the first pair of legs, said lower tray being hinged toward its other end to the inner end of a link which is hinged at its outer end to a second brace rigidly secured between the second of the two pairs of legs below said pivot with said second brace extending outwardly offset from the plane of the second pair of legs, the lower tray in said first positions of the legs extending horizontally and supported by the legs in the regions where its one end is hinged to the first brace and where the outer end of the link is hinged to the second brace, said link and lower tray acting as a toggle to cause the legs to move angularly in closing scissors fashion to their second positions upon upward pivotal movement of the lower tray in the region where its said one end is hinged to said first brace, said upper tray being hinged at one end to the second said pair of legs at a region above said pivot and ordinarily disconnected at its other end so that said upper tray can be pivoted to a horizontal position when the legs are in their first positions and to a free hanging vertical position when the legs are in their second positions with said other end directed downward.

3. A collapsible table according to claim 2 characterized by, the length of said link and the positioning of the said hinged connections between the lower tray, the brace, the two pairs of legs and the link being such that when the lower tray is moved pivotally upward to approximately a vertical position the two pairs of legs are in approximate parallel alignment with each other and with the lower tray.

4. A collapsible table according to claim 2 characterized by, a releasable fastener means being provided between the first of said pairs of legs and said upper tray to releasably hold said upper tray in its horizontal position, and the length of said link and the positioning of the said hinged connections between the lower tray, the two pairs of legs and the link being such that when the lower tray is moved pivotally upward to approximately a vertical position the two pairs of legs are in approximate parallel alignment with each other and with the lower tray and with the upper tray when in its free hanging position with the rear surfaces of the two trays facing each other and positioned opposite each other.

References Cited in the file of this patent

UNITED STATES PATENTS

| | | |
|---|---|---|
| 1,462,615 | Noble | July 24, 1923 |
| 1,942,603 | Johanson | Jan. 9, 1934 |
| 2,196,914 | Goldman | Apr. 9, 1940 |
| 2,429,034 | Smith | Oct. 14, 1947 |
| 2,544,220 | Concklin | Mar. 6, 1951 |
| 2,967,716 | Murcott | Jan. 10, 1961 |